Aug. 22, 1950 R. L. THOMPSON 2,519,513
BINARY COUNTING CIRCUIT
Filed Sept. 9, 1948
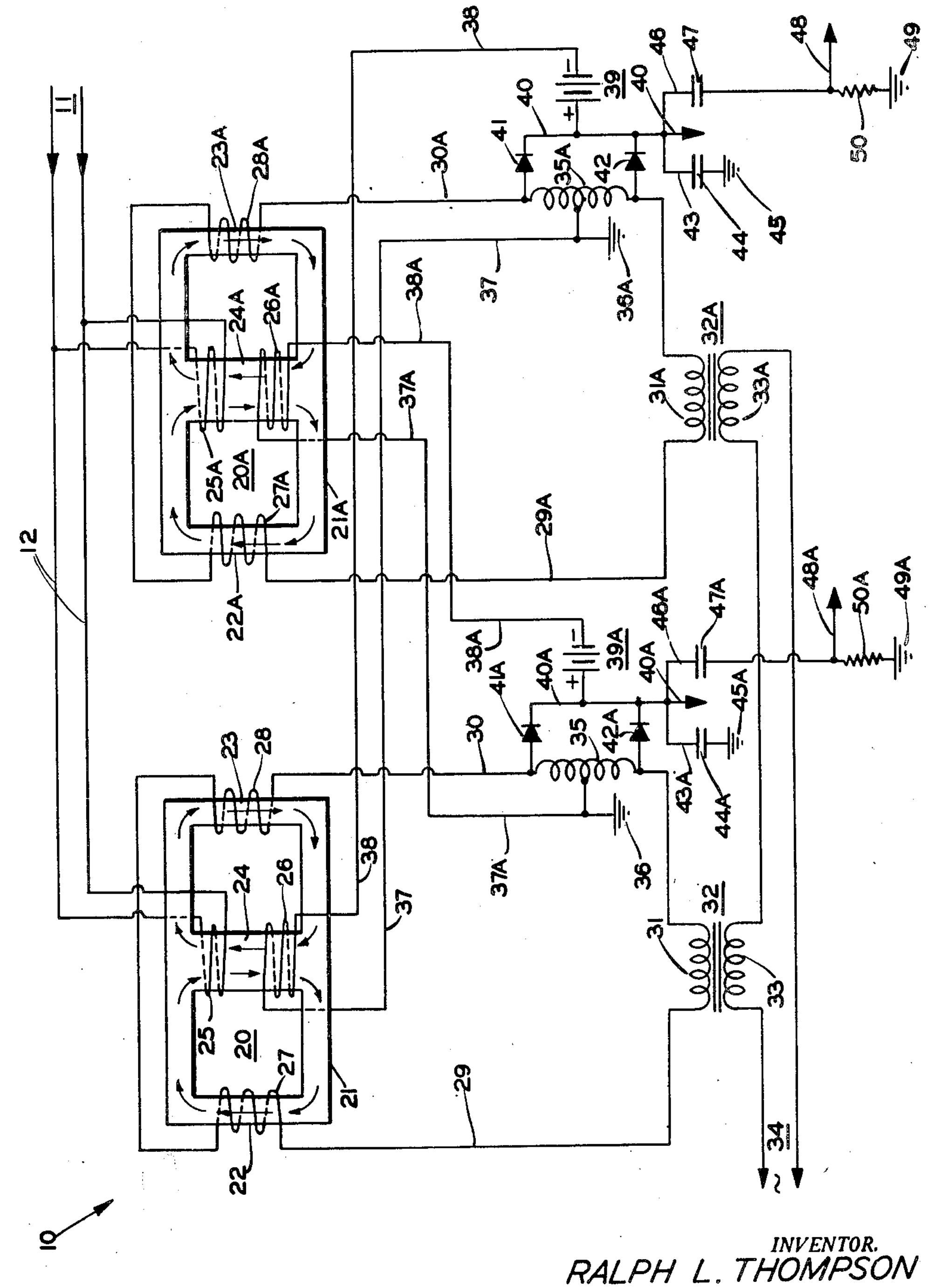
INVENTOR.
RALPH L. THOMPSON
BY [signature]
ATTORNEY Patented Aug. 22, 1950 2,519,513

UNITED STATES PATENT OFFICE 2,519,513

BINARY COUNTING CIRCUIT

Ralph L. Thompson, Mineola, N. Y.

Application September 9, 1948, Serial No. 48,510

13 Claims. (Cl. 171—97)

This invention relates to counting circuits, and more particularly to binary counting circuits.

In digital computers of previous design, relays arranged in sequential dependent order were used to convert the electrical impulses impressed on the circuit to pulses representative of binary numbers, the pulses then being carried over or transferred to other banks of relays where the computation steps required to solve a given problem were completed. With the advance of the electronic art, the more recently developed binary computers make use of many of the triggering circuits developed, particularly of the Eccles-Jordan or flip-flop circuit. This circuit in its essential elements comprises two triode vacuum amplifiers regeneratively connected through resistors and condensers so that either one tube or the other tube is always conducting. This condition would remain until a negative pulse is applied to the grids of the tubes, the tube which is conducting being biased to cut-off while the tube which is non-conducting would then conduct. By arranging any number of Eccles-Jordan circuits in cascade, the pulses applied to the initial control grids will be converted to the required binary numbers. While such binary counting circuits have many varied and practical applications, the operation of such systems under varied climatic and ambient conditions has been beset with many maintenance problems, such as periodic checking of the systems including power supply, replacement of tubes, reworking complicated circuits entailing tedious and costly rewiring operations, etc.

It is therefore an object of my present invention to provide an electrical binary counting circuit which shall consist of relatively few and simple parts, relatively inexpensive to manufacture, in which maintenance of the system is reduced to a minimum, which shall be positive and accurate in its operation, and yet be practical and efficient to a high degree in use.

A further object of my invention is to provide a binary counting circuit in which the several portions thereof have two conditions of stability, the stability of one portion of the circuit controlling the stability condition of the other portion of the circuit.

Another object of my invention is to provide a binary counting circuit in which the incoming pulse signal will change the stability condition of one portion of the circuit to change the stability of the other portion, the change in stability conditions providing a signal pulse output for two incoming pulse signals.

Other objects of this invention will in part be obvious, and in part hereinafter pointed out.

The invention accordingly consists in the features of construction, combination of circuit elements and arrangement of parts which will be exemplified in the construction hereinafter described, and of which the scope of application will be indicated in the appended claims.

The foregoing objects I accomplish by providing two saturable reactors each provided with a magnetizing winding and two saturating windings. One of the saturating windings of each reactor is connected to a source of saturating current, while the other of said saturating windings is connected to a signal source. One of said reactors is in a saturated condition while the other of said reactors is in an unsaturated condition. The incoming pulse signal will saturate the unsaturated reactor causing a change in the saturating current of the first reactor. The saturated reactor now becomes unsaturated, while the previously unsaturated reactor becomes saturated by the incoming pulse signal. The swing or flip-flop, of the two reactors between the two conditions of stability provides a signal impulse which is one-half the frequency of the incoming signal pulse.

In the accompanying wiring diagram forming a part of this specification in which one of the various possible illustrative embodiments of my invention is shown, the numeral 10 designates a counting circuit interconnecting a source of signal pulse 11 and two saturable reactors 20 and 20A.

The saturable reactor 20 comprises a soft iron core 21 having two outer legs 22, 23 and a middle leg 24. Wound about the middle leg 24 in aiding relation are two saturating windings 25 and 26; the winding 25 being connected to the signal source 11 by the leads 12. Two series connected coils 27 and 28 are wound about the outer legs 22, 23, respectively; the windings being such that upon energization thereof, the magnetic fluxes resulting from said coils cancelling or bucking each other out in the center leg 24. The coils 27, 28 are connected by leads 29 and 30 across the secondary winding 31 of a transformer 32, the primary winding 33 of which is connected to a source of suitable A. C. power supply 34. An impedance, here shown as a coil 35, center-tapped to ground as at 36, is connected into the lead 30. The saturating coil 26 is connected by leads 37 and 38 to a source of D. C. supply 39, as will hereinafter be more fully described.

The saturable reactor 20A is identical to the reactor 20 described, the corresponding elements of the reactor being designated by the same numerals and the subscript A, the saturating coil 25A being connected across the signal source 11.

The source of D. C. voltage 39 for the reactor 20 is connected at the negative terminal thereof to the lead 38, while the positive terminal is connected to an output lead 40. The output lead 40 interconnects the ends of the coil 35A through two crystal diodes 41 and 42. The output lead 40 is further connected through a lead 43 and a filtering condenser 44 to a ground point 45; and through a lead 46, and condenser 47 to a trigger lead 48; the lead 48 being isolated from a ground point 49 by a resistor 50.

An identical D. C. power supply 39A is provided for the saturating coil 26A, the supply being connected to an output lead 40A and a trigger lead 48A.

Assuming for the moment that core 21 of reactor 20 is saturated by the D. C. coil 26 about the middle leg 24 thereof, the inductance of the coils 22 and 23 about the outer legs will be reduced. The lowered inductance of the coils lowers the impedance of the circuit including such coils. The lowered impedance of the circuit will result in a greater flow of current through the circuit, which includes the inductive impedance 35. The greater flow of current provides a larger IR drop across the coil 35.

The coil 35 is center-tapped to ground, while the ends of the coil are connected through the rectifiers 41A, 42A to the output lead 40A. This portion of the circuit will be readily recognized as a full wave rectifier, the lead 40A being considered the plus terminal. From the connection of the lead 40A to the positive terminal of the battery 39A, it will be apparent that the increase in the voltage drop across the impedance 35 will oppose the voltage of the battery 39A. The current flowing through the saturating winding 26A of the reactor 20A is thus reduced, the core 21A thereof becoming unsaturated. The core 21A being unsaturated does not affect the normal impedance of the circuit including the windings 22A, 23A. The voltage drop therefore across the impedance 35A is therefor unchanged permitting the voltage of battery 39 to be impressed across the winding 26 of the reactor 20. The core 21 of reactor 20 is thus saturated, while the core 21A of reactor 20A is unsaturated.

If now a pulse from source 11 such as obtained by the closure of a switch, or the discharge of a vacuum tube or condenser, is applied across the leads 12, a saturating current will flow through the two parallel connected coils 25 and 25A of the two reactors. Since the core 21 has been described as being saturated, the incoming pulse will have no effect on the reactor 21.

The current in coil 25A of the reactor 20A which is unsaturated, will saturate the core 21A to lower the impedance of the circuit including the coils 27A, 28A. The voltage drop across the impedance 35 will thus be increased to provide a bucking voltage through the rectifier circuit, which opposes the voltage of the battery 39A. The saturating current in coil 26 will thus be reduced to provide an unsaturated core 21.

The unsaturated core 21 will increase the impedance of the circuit including the coils 27, 28 to lower the voltage drop across the coil 35. The battery 39A will thus supply the saturating current for coil 26A to hold the core 21A saturated. Thus the core 21A is now saturated and core 21 is no longer saturated. The reactor 20 is now in condition to receive the next incoming pulse from source 11, the cycle repeating itself to saturate core 21 and to unsaturate the core 21A.

The voltage available at the output lead 40 (to ground) will be positive voltage having a square wave form, the amplitude of which will be responsive to the voltage drop across the impedance 35A and whose frequency is one-half the frequency of the incoming pulse. The voltage available at output lead 40A (to ground) will have the same wave form and frequency as that of lead 40, but lagging the wave form of lead 40 by a half cycle. The output of trigger lead 48 (to ground) has a sharp rising, momentary wave form or "pip" due to the condenser 47 and resistor 50. The frequency of the available voltage will again be one-half that of the incoming pulse.

The output of trigger lead 48A will be similar to that of lead 48, but lagging a half cycle.

The available voltages of the leads 48 or 48A may be used to trigger a counter or additional binary counters to provide a counter action; the voltage of leads 40 and 40A being used for signal purposes to indicate which side of the circuit is conducting.

There is thus provided a binary counting circuit in which the several objects of this invention are achieved and which is well adapted to meet the conditions of practical use.

As various embodiments may be made of the above invention and as various changes may be made in the embodiment set forth above, it will be understood that all matter herein contained or shown in the accompanying drawings, is to be interpreted as illustrative and not in a limiting sense.

Having thus described my invention, I claim as new and desire to secure by Letters Patent:

1. A binary counting circuit comprising two saturable core devices, two saturating windings on each of said devices, a voltage source providing saturating current for one winding of each of said devices, and a source of signal voltage connected to both of the remaining saturating windings of said devices, an impedance connected in series with each of said devices and to the voltage source of the saturating winding of the other of said devices; the saturation of one of said devices by said signal voltage increasing the voltage drop across its associated impedance to oppose the saturating current source of the other of said devices to desaturate said other device.

2. A binary counting circuit comprising two saturable core devices, two saturating windings on each of said devices, a voltage source providing saturating current for one winding of each of said devices, and a source of signal voltage connected to both of the remaining saturating windings of said devices, an impedance connected in series with each of said devices and to the voltage source of the saturating winding of the other of said devices; the saturation of one of said devices by said signal voltage increasing the voltage drop across its associated impedance to oppose the saturating current source of the other of said devices to desaturate said other device, and means for providing a signal voltage upon saturation of said devices.

3. A binary circuit comprising a pair of windings connected to a source of potential, core means for each of said windings, saturating coils for said core means, a voltage source providing saturating current for said saturating coils, and an impedance connected in series with each of said windings and the voltage source of the saturating coil of the other core means, the saturation of one of said core means lowering the impedance in the winding circuit to decrease the saturating current of the other of said core means to desaturate said last core means.

4. A binary circuit comprising a pair of windings connected to a source of potential, core means for each of said windings, saturating coils for said core means, a voltage source providing saturating current for said saturating coils, and an impedance connected in the circuit of each of said windings and to the voltage source for the coil of the other core means, the voltage drop across said impedance opposing said voltage source; the saturation of one of said core means increasing the voltage drop across its associated impedance to decrease the saturating current of the other of said core means to desaturate said last core means.

5. A binary circuit comprising a pair of windings connected to a source of potential, core means for each of said windings, saturating coils for said core means, a voltage source providing saturating current for said saturating coils, and an impedance connected in the circuit of each of said windings and to the voltage source for the coil of the other core means, the voltage drop across said impedance opposing said voltage source; the saturation of one of said core means increasing the voltage drop across its associated impedance to decrease the saturating current of the other of said core means to desaturate said last core means, the saturation of one of said core means providing a pulse of signal voltage from the source of saturating current of the other said core means.

6. A binary counting circuit comprising two reactors connected to a source of potential, saturating means for each of said reactors, said last means including a source of signal voltage, and circuit means interconnecting said reactors, said circuit means including rectifier means connected to each of said reactors and in opposition to said saturating means for alternately saturating and desaturating said reactors in response to the signal voltage.

7. A binary counting circuit comprising two reactors connected to a source of alternating current, direct current saturating means for said reactors, a pulsing signal voltage source for saturating said reactors, and circuit means including rectifier means in opposition to said direct current saturating means interconnecting said reactors for alternately saturating and desaturating said reactors in response to the saturation thereby by the signal voltage source.

8. A binary counting circuit comprising two reactors connected to a source of alternating current, direct current saturating means for said reactors, a pulsing signal voltage source for saturating said reactors, and circuit means including rectifier means interconnecting said reactors and said direct current saturating means, the output of said rectifier means opposing said direct current saturating means for alternately saturating and desaturating said reactors in response to the saturation thereof by the signal voltage source, said circuit for providing a signal voltage output at a frequency less than the frequency of the saturating signal voltage source in response to the alternate saturating and desaturating of said reactors.

9. A binary counting circuit comprising at least two reactors connected to a source of alternating current, saturating windings for said reactors, direct current saturating means for said windings including a source of pulsating signal voltage, an impedance connected into the circuit of each of said reactors, and rectifying means connected across each of said impedances to provide a D. C. voltage proportional to the voltage drop across its associated impedance, the output of said rectifying means being connected to oppose the direct current saturating means of the disassociated reactor to desaturate said last reactor upon saturation of the first reactor in response to signal voltage.

10. A binary counting circuit comprising at least two reactors connected to a source of alternating current, saturating windings for said reactors, direct current saturating means for said windings including a source of pulsating signal voltage, an impedance connected into the circuit of each of said reactors, rectifying means connected across each of said impedances to provide a D. C. voltage proportional to the voltage drop across its associated impedance, the output of said rectifying means being connected to oppose the direct current saturating means of the disassociated reactor to desaturate said last reactor upon saturation of the first reactor in response to signal voltage, and means connected to the interconnection of said rectifying means and said saturating means providing a signal voltage output at a frequency less than the frequency of the signal voltage source in response to the saturation and desaturation of said reactors.

11. A binary counting circuit comprising two saturable core reactors connected to a source of alternating current, two saturating windings for each of said reactors, a source of direct current for a saturating winding of each reactor, and a source of pulsating voltage connected to the other of said saturating windings of both reactors; an inductive impedance connected into the circuit of each of said reactors, and a rectifier connected across each impedance to provide a voltage responsive to the voltage drop across said impedance, the output of each rectifier being connected in opposition to the disassociated source of saturating direct current; the saturation of one of said reactors due to signal voltage increasing the voltage drop across its associated impedance to desaturate the other of said reactors.

12. A binary counting circuit comprising two saturable core reactors connected to a source of alternating current, two saturating windings for each of said reactors, a source of direct current for a saturating winding of each reactor, and a source of pulsating voltage connected to the other of said saturating windings of both reactors; an inductive impedance connected into the circuit of each of said reactors, and a rectifier connected across each impedance to provide a voltage responsive to the voltage drop across said impedance, the output of each rectifier being connected in opposition to the disassociated source of saturating direct current; the saturation of one of said reactors due to signal voltage increasing the voltage drop across its associated impedance to desaturate the other of said reactors, and means connected to the interconnection of the rectifiers and direct current saturating sources to provide a signal voltage output of one-half the frequency of the signal voltage source in response to the alternate saturation and desaturation of said reactors.

13. A binary counting circuit comprising two saturable core reactors connected to a source of alternating current, two saturating windings for each of said reactors, a source of direct current for a saturating winding of each reactor, and a source of pulsating voltage connected to the other of said saturating windings of both reactors; an inductive impedance connected into the circuit of each of said reactors, and a full-wave rectifier connected across each impedance to provide a voltage responsive to the voltage drop across said impedance, the output of each rectifier being connected in opposition to the disassociated source of saturating direct current; the saturation of one of said reactors due to signal voltage increasing the voltage drop across its associated impedance to desaturate the other of said reactors, and means connected to the interconnection of the rectifiers and direct current saturating sources to provide a signal voltage output of one-half the frequency of the signal voltage source in response to the alternate saturation and desaturation of said reactors.

RALPH L. THOMPSON.

REFERENCES CITED

The following references are of record in the file of this patent:

UNITED STATES PATENTS

| Number | Name | Date |
|---|---|---|
| 1,824,577 | Sorensen | Sept. 22, 1931 |